2 Sheets—Sheet 1.

L. CAHILL.
WHEEL-PLOW.

No. 174,473. Patented March 7, 1876.

WITNESSES
Franck L. Ourand
C. L. Evert

INVENTOR
Leroy Cahill
Alexander Mason
By Attorneys

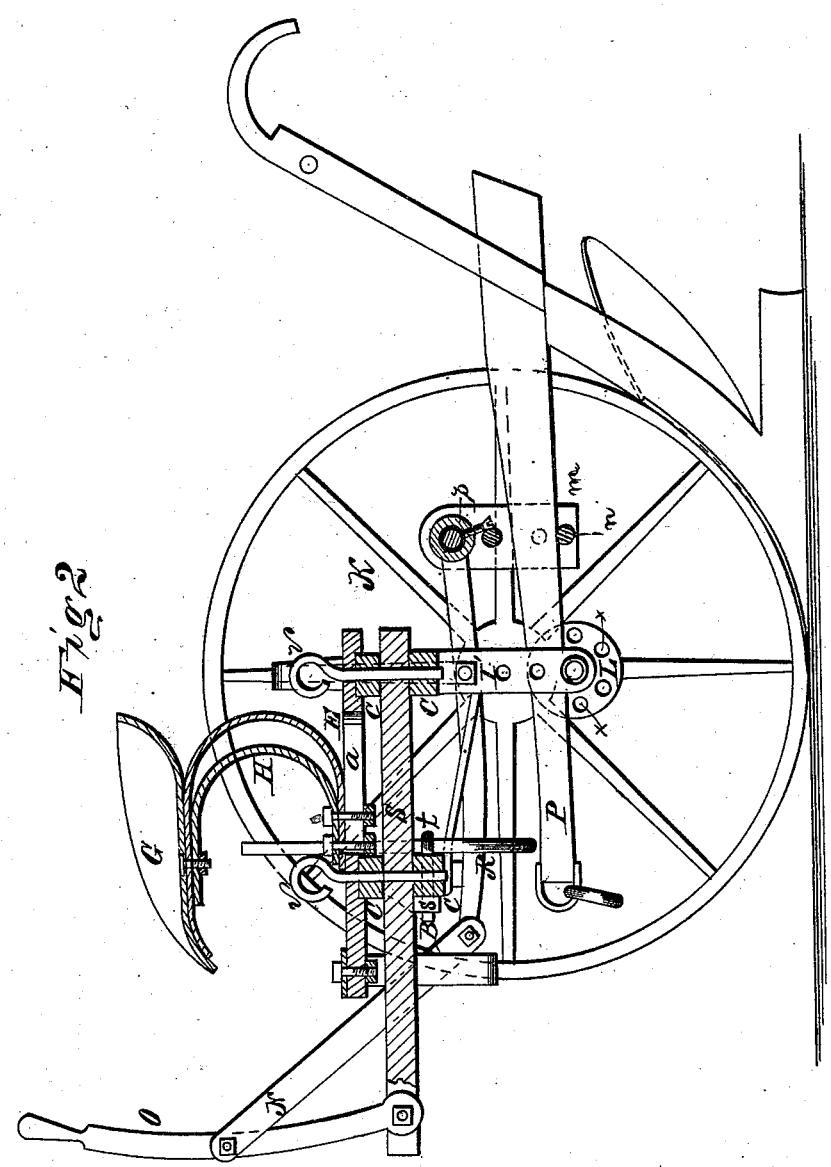

UNITED STATES PATENT OFFICE.

LEROY CAHILL, OF KALAMAZOO, MICHIGAN.

IMPROVEMENT IN WHEEL-PLOWS.

Specification forming part of Letters Patent No. 174,473, dated March 7, 1876; application filed March 2, 1876.

*To all whom it may concern:*

Be it known that I, LEROY CAHILL, of Kalamazoo, in the county of Kalamazoo and in the State of Michigan, have invented certain new and useful Improvements in Wheel-Plows; and do hereby declare that the following is a full, clear, and exact description thereof, reference being had to the accompanying drawings, and to the letters of reference marked thereon, making a part of this specification.

The nature of my invention consists in the construction and arrangement of a wheel-plow, as will be hereinafter more fully set forth.

In order to enable others skilled in the art to which my invention appertains to make and use the same, I will now proceed to describe its construction and operation, referring to the annexed drawings, in which—

Figure 1:
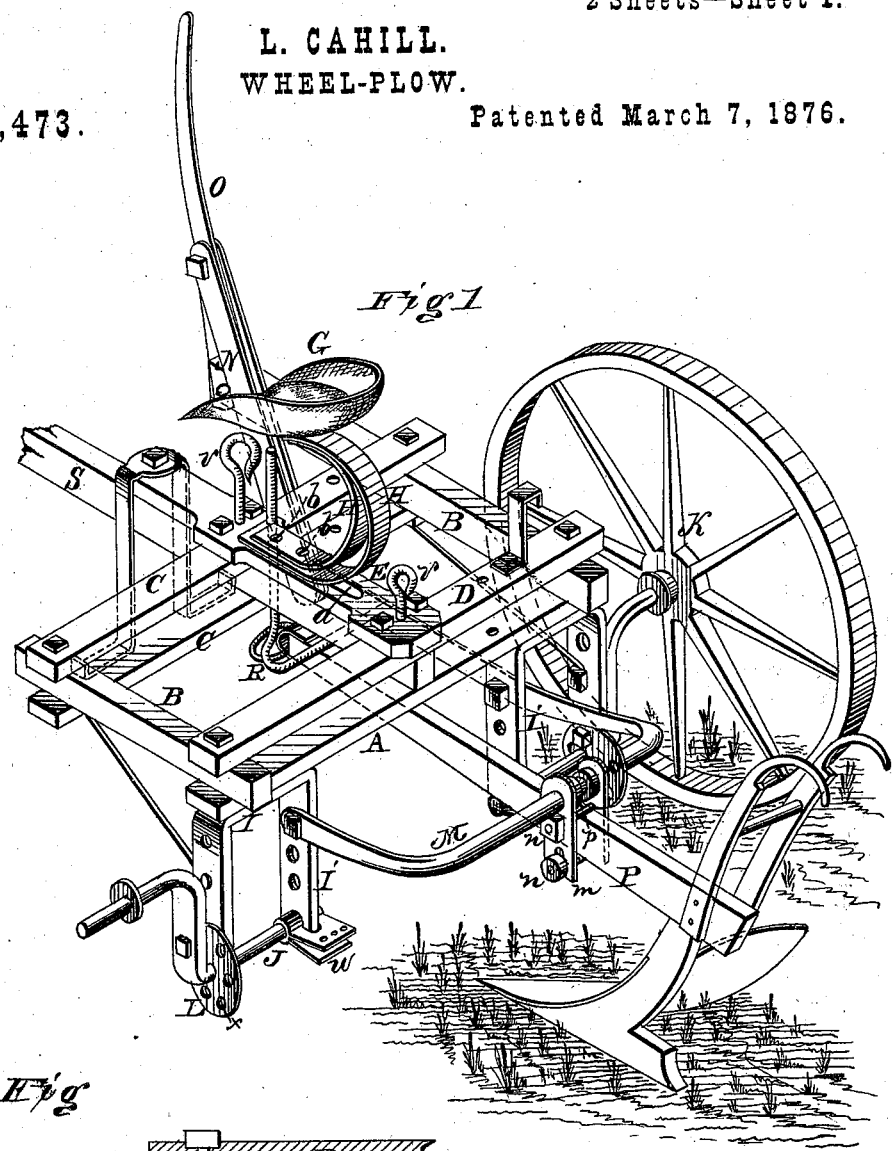
Figure 2:
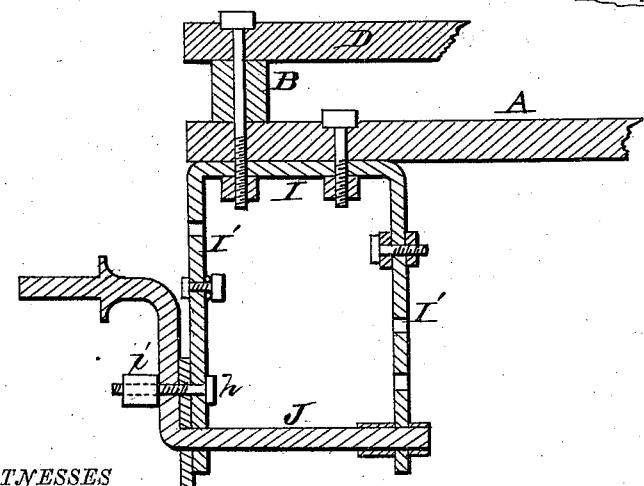

Figure 1 is a perspective view of my wheel-plow. Fig. 2 is a longitudinal section of the same. Fig. 3 is an enlarged longitudinal section through one end of the axle-tree.

A represents the axle-tree, having near each end a bar, B, secured thereto at right angles, and extending forward a suitable distance. At the front ends of the side bars B B are top and bottom bars C C, parallel with the axle, and above the axle, on top of said side bars, is another bar, D, the whole forming the frame for the wheel-plow. Across the center of this frame is a platform, E, which is provided with a longitudinal slot, $a$, for adjusting the driver's seat G backward and forward, as required. This seat is supported upon two curved springs, H H, the upper ends of which are secured to the under side of the seat, and the lower ends are fastened by bolts and nuts $b\ b$ in the slot $a$ of the platform E, so as to be adjusted and fastened at any point thereon desired. To the under side of the axle-tree A, at each end, is fastened a metal bar, I, having its ends bent downward at right angles, forming two parallel pendants, I' I', through the lower ends of which the short axle J is passed. The outer end of the axle is bent in crank form, and has the driving-wheel K placed upon its outer horizontal end. On the axle J, immediately outside of the outer hanger I', is secured a metal disk, L, provided with a series of perforations, $x\ x$, arranged in circular form concentric with the axle. This disk is fastened, by a bolt, $h$, and nut $i$, to the outer hanger I', the bolt passing through the angular part of the axle, as shown, to hold the axle firmly in its place. By taking out this bolt the axle may be changed to any angle desired and fastened again, and the spindle part of the axle can be turned entirely around on a circle and fastened at any point.

The inner hanger I', on each side, is perforated, and at any suitable height thereon is pivoted a bail, M, one arm of which is extended forward and connected by a link, N, with a lever, O, pivoted to the extended front end of one of the side bars B of the frame. From this bail M is suspended a plow, P, by means of two hangers or plates, $m\ m$, placed on the bail, and having bolts $n\ n$ passed through them, between which the plow-beam is inserted. The plow-beam can be moved from side to side by sliding the hangers or plates $m$ on the bail, and fastened at any desired point by means of collars $p\ p$, placed on the bail between said plates, and secured by set-screws thereon.

The front end of the plow-beam bears against the under side of the horizontal portion of an L-shaped rod, R, the vertical part of which passes up through a hole in the platform E, and is held to the lower front bar C by an eye-bolt, $t$, through which it passes, and a nut, $s$, screwed on the end of the bolt. The rod R can thus easily be adjusted up and down, so as to regulate the holding of the front end of the plow-beam.

S represents the tongue or pole, which is inserted between the bars C C, at the front of the frame, and the axle-tree A and bar D at the back, and held therein by vertical pins $v\ v$. When two horses are used the tongue is placed in the center of the frame, as shown in Fig. 1; but when three horses are used the tongue will be moved to one side of the frame by removing the pins $v$ and placing them in other holes in the frame.

The carriage may be used for a cultivator by removing the plow, and attaching the cultivator-beams to slotted couplings $w$, placed upon the inner ends of the axles J, and surrounding the lower ends of the inner hangers I'.

It may also be used for a corn-stalk cutter by removing the bail P, and attaching in lieu thereof a frame carrying the revolving cutter.

I do not broadly claim an axle which is adjusted with respect to the frame by means of ratchets, clutches, or a lever; nor do I broadly claim a shifting tongue, as I am aware that such is not new.

Having thus fully described my invention, what I claim as new, and desire to secure by Letters Patent, is—

1. The combination of the frame, consisting of the perforated bars A D and C C, separated by the side bars B B, as described, the perforated tongue S, and pins $v\ v$, whereby the tongue may be shifted from the center to the side, and vice versa, all constructed substantially as set forth.

2. The combination of the platform E, with slot $a$ and foot-rest, the seat G, double-spring supports H H, and bolts $b\ b$, to adjust the seat back and forth, as herein set forth.

3. The combination of the hangers I' I', crank-axle J, with perforated disk L, bolt $h$, and nut $i$, as and for the purposes herein set forth.

4. The combination of the frame A D C C, having shifting tongue, and with extended bar B at one side, the hangers $m\ m$, bail M, having extended arm, the link N, pivoted to the front end of the bail, and to the lever O, which is pivoted to the forward part of the extended bar B, all constructed substantially as and for the purposes herein set forth.

In testimony that I claim the foregoing I have hereunto set my hand this 2d day of March, 1876.

LEROY CAHILL.

Witnesses:
   H. A. HALL,
   C. M. ALEXANDER.